(12) United States Patent
Natanzon

(10) Patent No.: US 9,767,111 B1
(45) Date of Patent: Sep. 19, 2017

(54) METHOD AND APPARATUS FOR MANAGING A DYNAMIC JOURNAL USING THE PUNCH COMMAND

(75) Inventor: Assaf Natanzon, Ramat Gan (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 612 days.

(21) Appl. No.: 13/073,391

(22) Filed: Mar. 28, 2011

(51) Int. Cl.
*G06F 17/30* (2006.01)

(52) U.S. Cl.
CPC .. *G06F 17/30138* (2013.01); *G06F 17/30073* (2013.01); *G06F 17/30185* (2013.01)

(58) Field of Classification Search
CPC ........... G06F 17/3007; G06F 17/30227; G06F 17/30191
USPC ............................ 707/609–686; 711/100–173
See application file for complete search history.

(56) References Cited

U.S. PATENT DOCUMENTS

| | | | |
|---|---|---|---|
| 7,111,136 B2 * | 9/2006 | Yamagami | G06F 11/1471 707/999.202 |
| 7,444,545 B2 * | 10/2008 | Asano | G06F 11/1471 714/15 |
| 7,603,532 B2 * | 10/2009 | Rajan et al. | 711/166 |
| 7,685,378 B2 * | 3/2010 | Arakawa et al. | 711/154 |
| 7,840,536 B1 * | 11/2010 | Ahal et al. | 707/648 |
| 7,873,860 B2 * | 1/2011 | Kaiya et al. | 714/2 |
| 7,979,399 B2 * | 7/2011 | Barsness et al. | 707/662 |
| 8,086,881 B2 * | 12/2011 | Maruyama | G06F 1/3221 711/E12.103 |
| 2006/0036660 A1 * | 2/2006 | Lynn | G06F 17/30368 |
| 2008/0082591 A1 * | 4/2008 | Ahal et al. | 707/204 |
| 2009/0019308 A1 * | 1/2009 | Amano | G06F 11/1471 714/19 |

* cited by examiner

*Primary Examiner* — Michelle Owyang
(74) *Attorney, Agent, or Firm* — Krishnendu Gupta

(57) ABSTRACT

Example embodiments of the present invention leverage the punch command and thin LUNs in order to create a fully dynamic journal which can shrink and grow on demand. The journal may be assigned a maximum allowed size, as well as a journal protection window defining a period for which the journal should retain journal information. A set of currently used blocks will be used and, if protection window is large enough, the oldest data blocks from an undo stream will be punched out from the stream. A manager may monitor how much free space there is in the storage pool and regulate the journal growth if the pool is nearly empty. Additionally, the journal capacity may also depend on the actual usage of the replicated LUNs if the replicated LUNs are thin (i.e., maintain the journal at a particular percentage of the used storage capacity).

17 Claims, 6 Drawing Sheets

US 9,767,111 B1

METHOD AND APPARATUS FOR MANAGING A DYNAMIC JOURNAL USING THE PUNCH COMMAND

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

Example embodiments of the present invention include a method, apparatus and computer program product for managing a dynamic journal using the punch command. The method comprises storing a plurality of journal data streams for a journal in a thin-provisioned continuous data protection system in storage, monitoring fullness of the journal and managing a size of the journal according to a policy as determined by the fullness of the journal.

BRIEF DESCRIPTION OF THE DRAWINGS

The above and further advantages of the present invention may be better under stood by referring to the following description taken into conjunction with the accompanying drawings in which.

DETAILED DESCRIPTION

Figure 1:
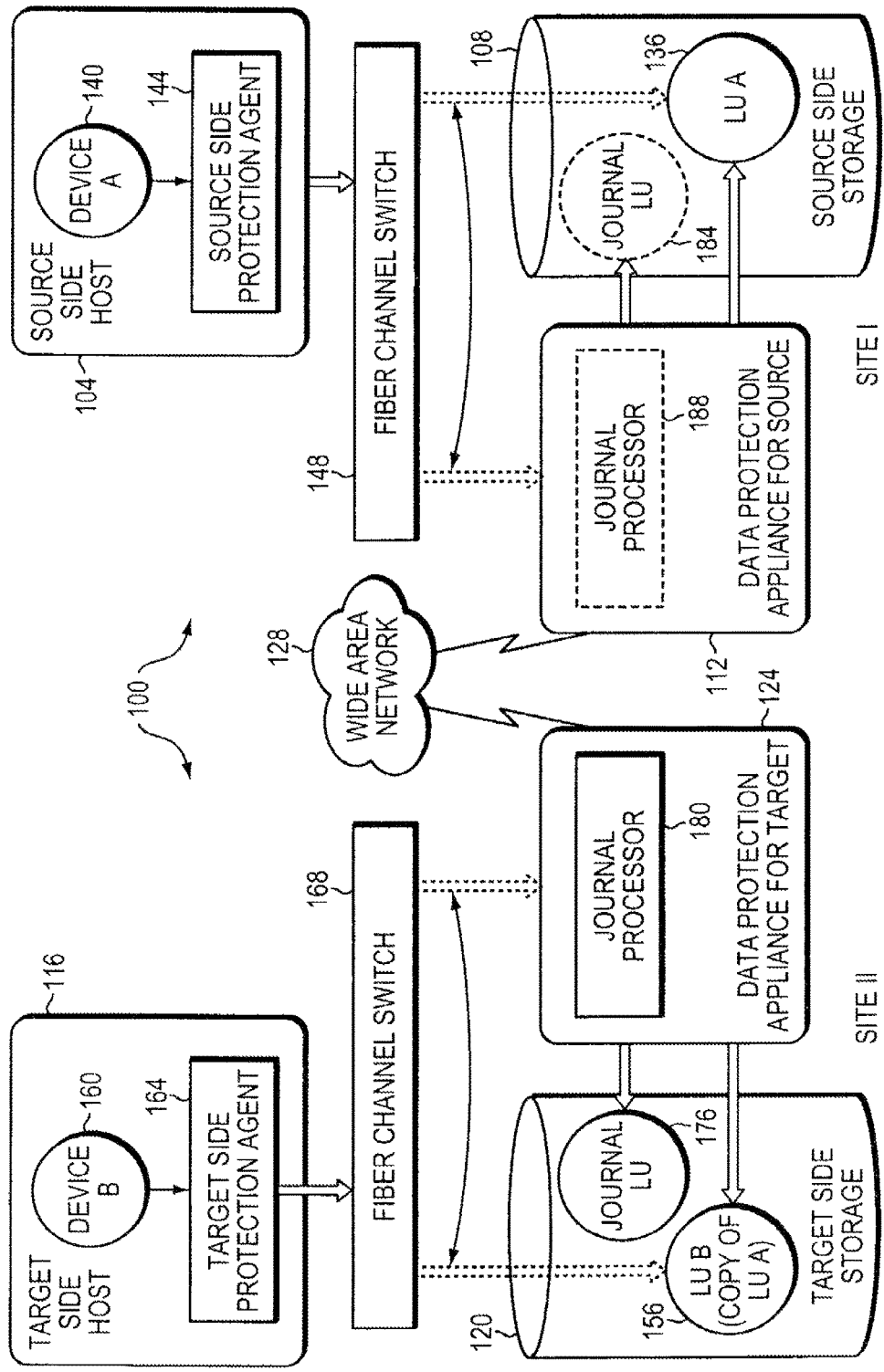
FIG. 1 is a simplified illustration of a data protection system, in accordance with an embodiment of the present invention.

Journaling uses significant amounts of the volume on which the journal is stored. Conventionally, replication systems dynamically add storage for a journal, as described in U.S. Pat. No. 7,840,536, entitled "METHODS AND APPARATUS FOR DYNAMIC JOURNAL EXPANSION ASSIGNED," issued on Nov. 23, 2010 and assigned to EMC Corporation of Hopkinton, Mass., which is hereby incorporated by reference in its entirety. However, such conventional journaling mechanisms lack efficient methods to decrease the size of the journal.

Accordingly, example embodiments of the present invention leverage the punch command and thin LUNs in order to create a fully dynamic journal which can shrink and grow on demand. The journal may be assigned a maximum allowed size, as well as a journal protection window defining a period for which the journal should retain journal information. A set of currently used blocks will be used and, if protection window is large enough, the oldest data blocks from an undo stream will be punched out from the stream. The blocks may be large journal blocks of a direct LUN (DLUN). DLUNs are LUNs which thin having large volume chunks (e.g., 128 MB or 1 GB). Accordingly, the punch command punches large slices out of the LUN; however, the chunks are big enough that sequential IOs remain sequential, thereby increasing performance. A manager may monitor how much free space there is in the storage pool and regulate the journal growth if the pool is nearly empty. Additionally, the journal capacity may also depend on the actual usage of the replicated LUNs if the replicated LUNs are thin (i.e., maintain the journal at a particular percentage of the used storage capacity).

The following definitions are employed throughout the specification and claims.

BACKUP SITE—a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

DPA—a computer or a cluster of computers that serve as a data protection appliance, responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period;

SPLITTER/PROTECTION AGENT—may be an agent running either on a production host a switch or a storage array which can intercept IO and split them to a DPA and to the storage array, fail IO redirect IO or do any other manipulation to the IO;

STORAGE SYSTEM—a SAN entity that provides multiple logical units for access by multiple SAN initiators;

TARGET—a node in a SAN that replies to I/O requests;

TARGET SIDE—a receiver of data within a data replication workflow; during normal operation a back site is the target side, and during data recovery a production site is the target side; and WAN—a wide area network that connects local networks and enables them to communicate with one another, such as the Internet.

Description of Embodiments Using a Five State Journaling Process

FIG. 1 is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit;
Redirect the SCSI command to another logical unit;
Split the SCSI command by sending it first to the respective DPA. After the DPA returns an acknowledgement, send the SCSI command to its intended logical unit;
Fail a SCSI command by returning an error return code; and
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
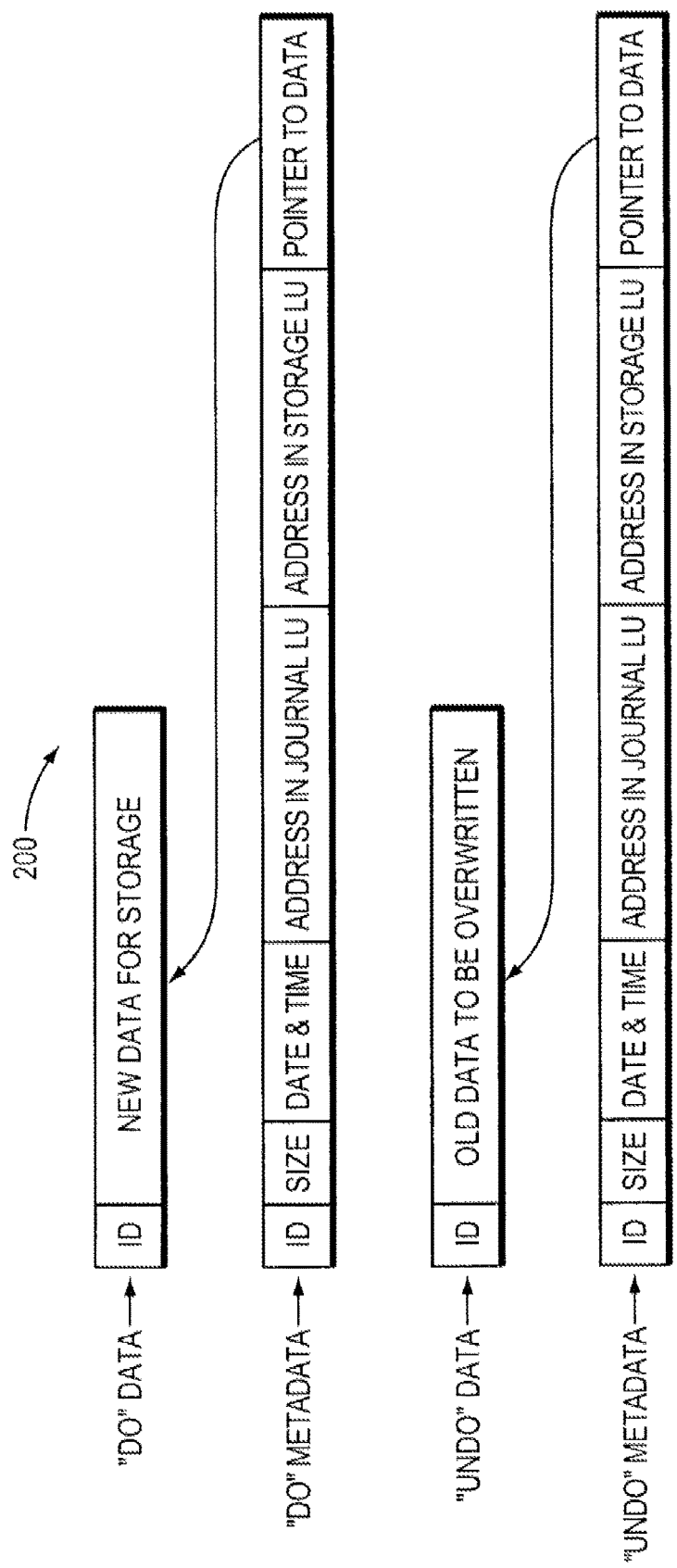
FIG. 2 is a simplified illustration of a write transaction for a journal, in accordance with an embodiment of the present invention.

FIG. 2 is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
  one or more identifiers;
  a time stamp, which is the date & time at which the transaction was received by source side DPA 112;
  a write size, which is the size of the data block;
  a location in journal LU 176 where the data is entered;
  a location in LU B where the data is to be written; and
  the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

A discussion of mirroring may be found in U.S. Pat. No. 7,346,805, entitled "PROTECTION OF MIRRORED DATA," issued on Mar. 18, 2008 and assigned to EMC Corporation of Hopkinton, Mass., which is hereby incorporated by reference in its entirety.

A discussion of journaling and some techniques associated with journaling may be found in U.S. Pat. No. 7,516,287, entitled "METHODS AND APPARATUS FOR OPTIMAL JOURNALING FOR CONTINUOUS DATA REPLICATION," issued on Apr. 7, 2009 and assigned to EMC Corporation of Hopkinton, Mass., which is hereby incorporated by reference in its entirety.

A discussion of dynamically adding storage for a journal may be found in U.S. Pat. No. 7,840,536, entitled "METHODS AND APPARATUS FOR DYNAMIC JOURNAL EXPANSION," issued on Nov. 23, 2010 and assigned to EMC Corporation of Hopkinton, Mass., which is hereby incorporated by reference in its entirety.

Managing a Dynamic Journal Using the Punch Command

The journal has two parts: (1) the meta data and stream meta data area; and (2) the data area. The meta data area contains a list of all the blocks in the journal and for each lock the following info is kept: (1) block ID; (2) stream using the block (if the block is part of a stream), otherwise the block is not used; (3) next block in the stream; (4) previous block in the stream; (5) start offset in the block; and (6) end offset in the block Each block, for example, may be of a size which is a multiple of 128 MB and aligned, with each block being the same size. A block which is not used in any stream will be punched out. A block added to a stream can be written to and is assumed as allocated. A stream is basically a list of blocks in the journal and for each block only a portion of the block can be used. The stream can keep its structure in the meta data area of the journal. The data of the stream may contain pointers to the last and first blocks of the stream.

Figure 3A:
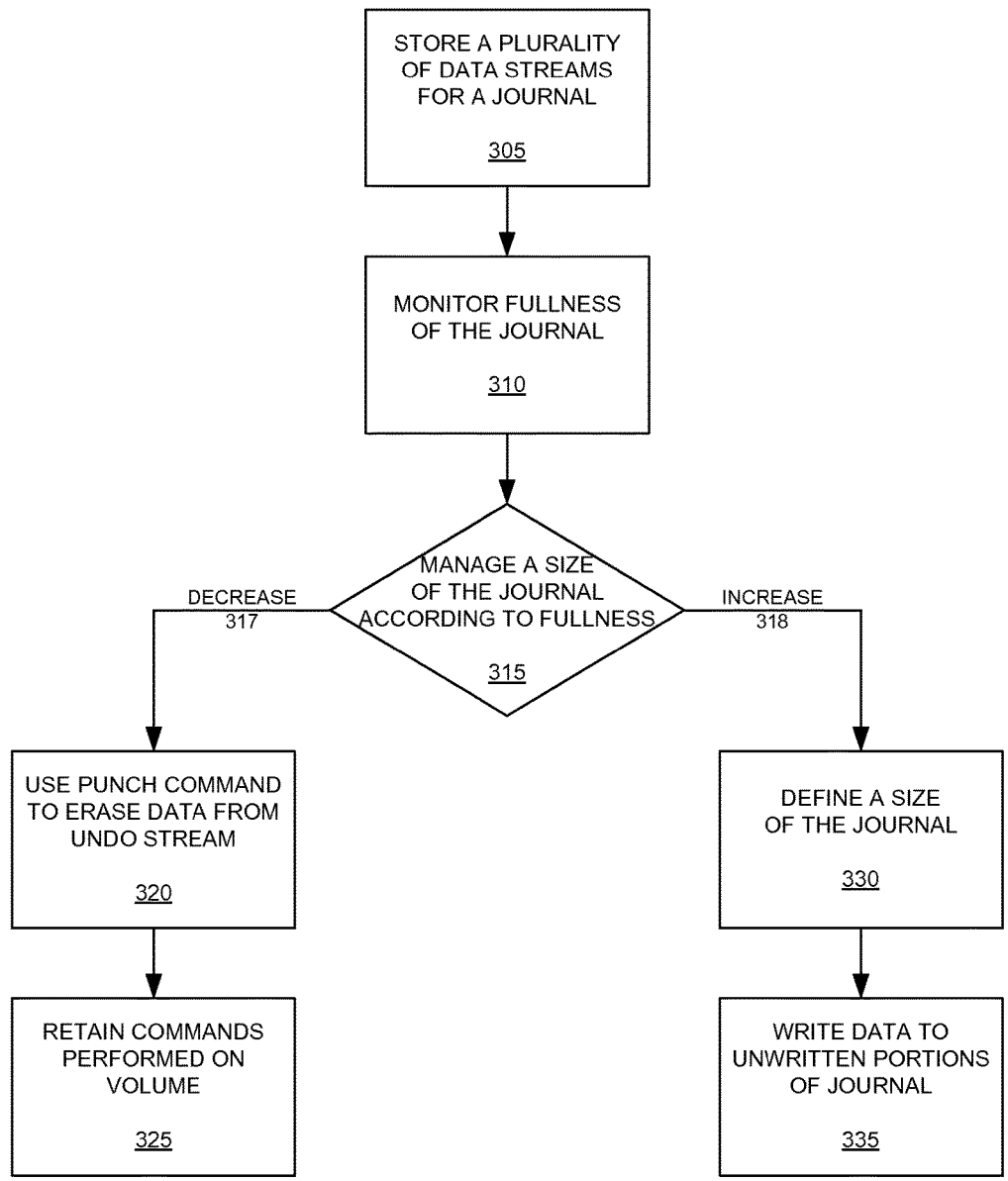
FIGS. 3A-3B are a flow diagram illustrating an example embodiment method according to the present invention.
Figure 3B:
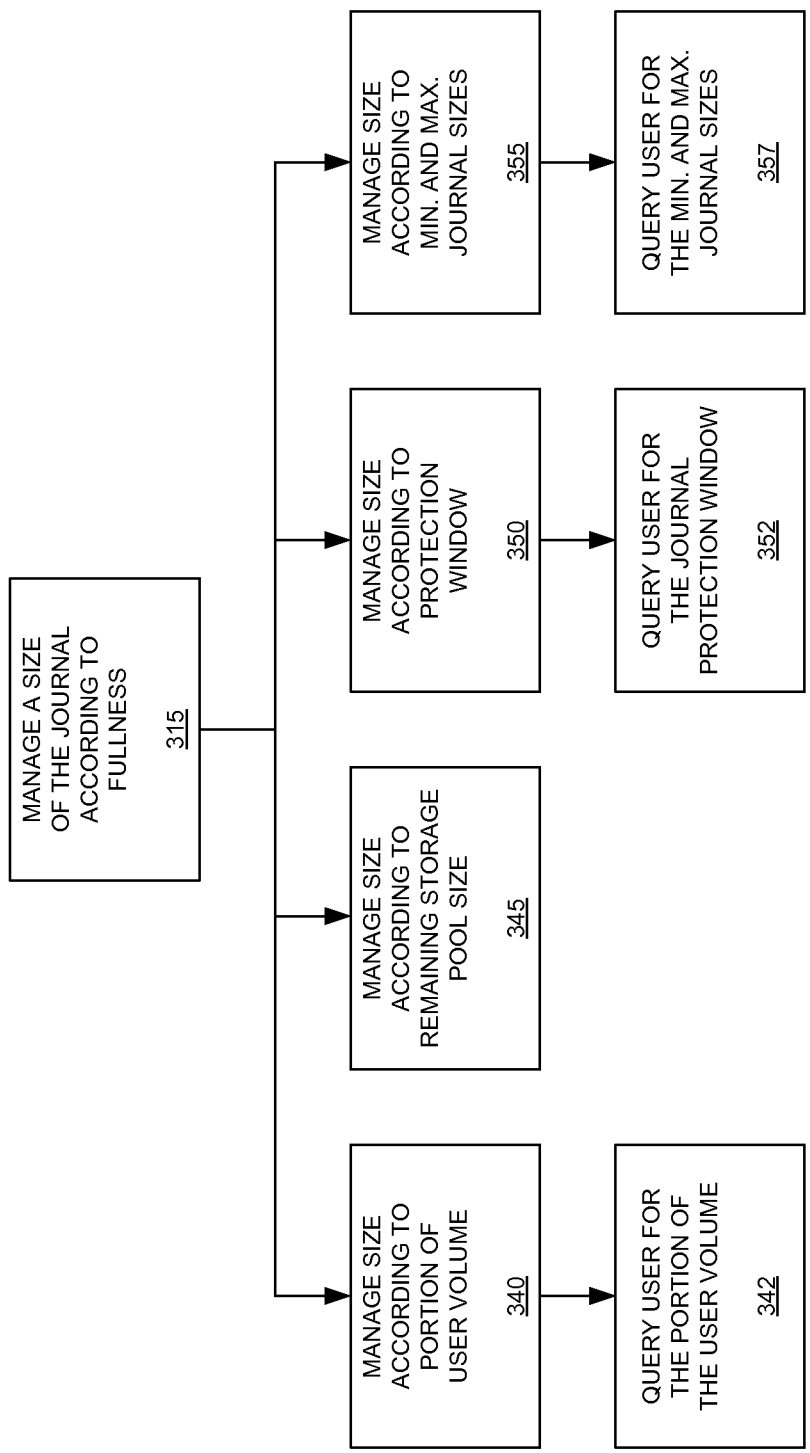

Freeing space in the journal is done by removing a block from a stream and punching it out. Allocating space is done by allowing allocation of new unused blocks to streams. FIGS. 3A-3B are a flow diagram illustrating an example embodiment method according to the present invention, the descriptions of which are intended to be read in conjunction with FIGS. 4A-4B, which are illustrations of a simplified method of managing a dynamic journal using the punch command, in accordance with embodiments of the present invention.

Figure 4A:
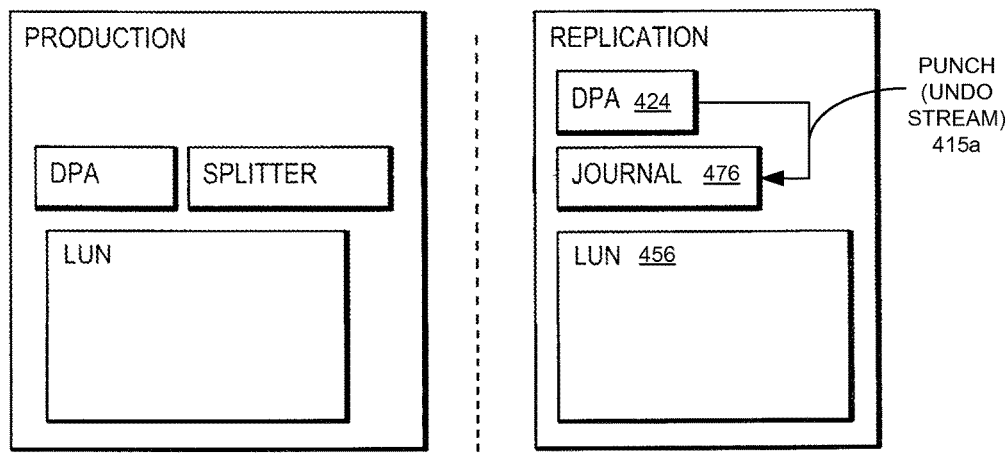
FIG. 4-4B are an illustration of a simplified method of managing a dynamic journal using the punch command, in accordance with an embodiment of the present invention.

As illustrated in FIGS. 3A and 4A, the DPA 424 stores a plurality of journal data streams (not shown) (e.g., illustrated in FIG. 2) for a journal 476 in a continuous data protection system having thin-provisioned storage and LUNs (e.g., system 100 of FIG. 1) in storage (not shown) (e.g., storage 120 of FIG. 1) (305). The DPA 424 then monitors fullness of the journal 476 (310) and manages a size of the journal 476 according to a policy as determined by the fullness of the journal 476 (315).

Figure 4B:
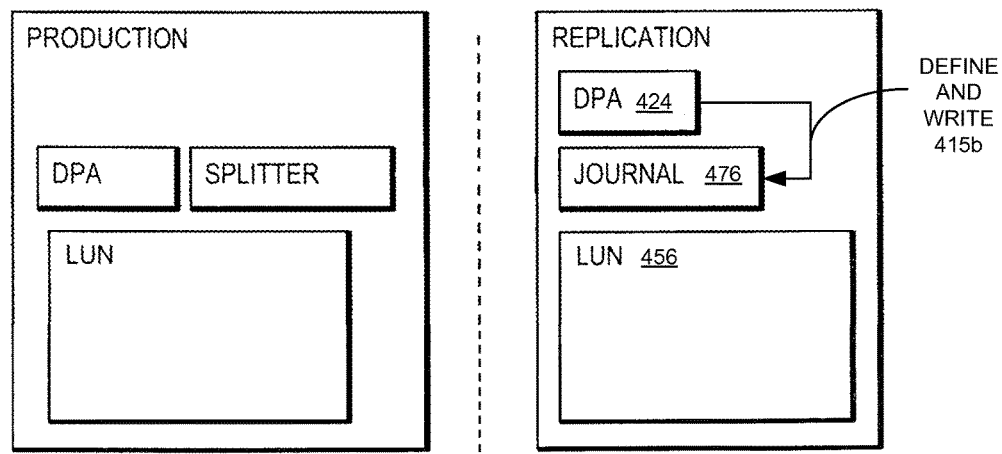

The DPA 424 may manage the size of the journal 476 according to the policy by increasing (317) and decreasing (318) the size of the journal 476 according to the policy. For example, in an example embodiment in which the plurality of journal data streams comprises a DO stream and an UNDO stream, the DPA 424 may decrease the size of the journal 476 according to the policy using a punch command 415 to erase data from blocks of the UNDO stream (320). It should be noticed that results of the punch command 415 retain underlying commands performed on the volume (e.g., LUN 456) which the journal 476 is journaling (325). Additionally, as illustrated in FIG. 4B, in an example embodiment in which the plurality of journal data streams comprises a DO stream and an UNDO stream, the DPA 424 may increase the size of the journal 476 by defining a size of the journal 476 (330) and writing data to unwritten portions of the journal 476 (415*b*) (335).

As illustrated in FIG. 3B, the DPA 424 may manage the size of the journal 476 according to a policy as determined by the fullness of the user volumes 456 (315). In a first example embodiment, the journal size is managed proportional to the size of the user volumes (340). In an example in which user volumes may be thin, the actual allocated capacity of the user volumes is measured compared to the full capacity of the volume and, if the user volumes are 30% allocated, the upper limit of journal allocation will be 30%. In another example in which user volumes may be either thin or not thin, the journal may be configured to consume up to 20% of the space the user volume consumed. Accordingly, in such an example, if another user volume is added to the consistency group, the journal may be allowed to grow. The policy may be user selectable and a user may be queried for the portion of the user volume used to determine journal size (342). Accordingly, the system periodically checks the allocated portion of the user volumes and updates the journal maximum size accordingly.

In a further example embodiment, the system may limit the journal size and force freeing space from the journal if the storage pool from which the journal volume is allocated is running out of physical space (345).

In another example embodiment, the policy may manage the size of the journal 476 according to a journal protection window for which journal data is retained (350). The system will monitor the protection window (i.e., a period of time for which the undo stream is maintained) and, if the current protection window is larger than required, old snapshots will be punched out of the undo stream. A user may be queried for the journal protection window (352).

In an additional example embodiment, the policy may manage the size of the journal 476 according to a minimum journal size and a maximum journal size (355). The minimum and maximum journal sizes may be user-definable by query (357). The system will limit the journal size to be within the minimum and the maximum journal sizes and try to maintain other policies discussed above. If the journal is at the minimum size, no punches will occur; the system will try to keep journal as small as possible while maintaining other policies (e.g., protection window). However, the journal will not grow beyond the maximum journal size even if the result is that the protection window cannot be maintained. For example, a user who desires to grow the journal farther will need to update the maximum journal size parameter.

It should be understood that a user may be queried for values of at least one of the portion of the volume on which the journal is stored (342), the journal protection window (352), and the minimum journal size and the maximum journal size (357).

Figure 5:
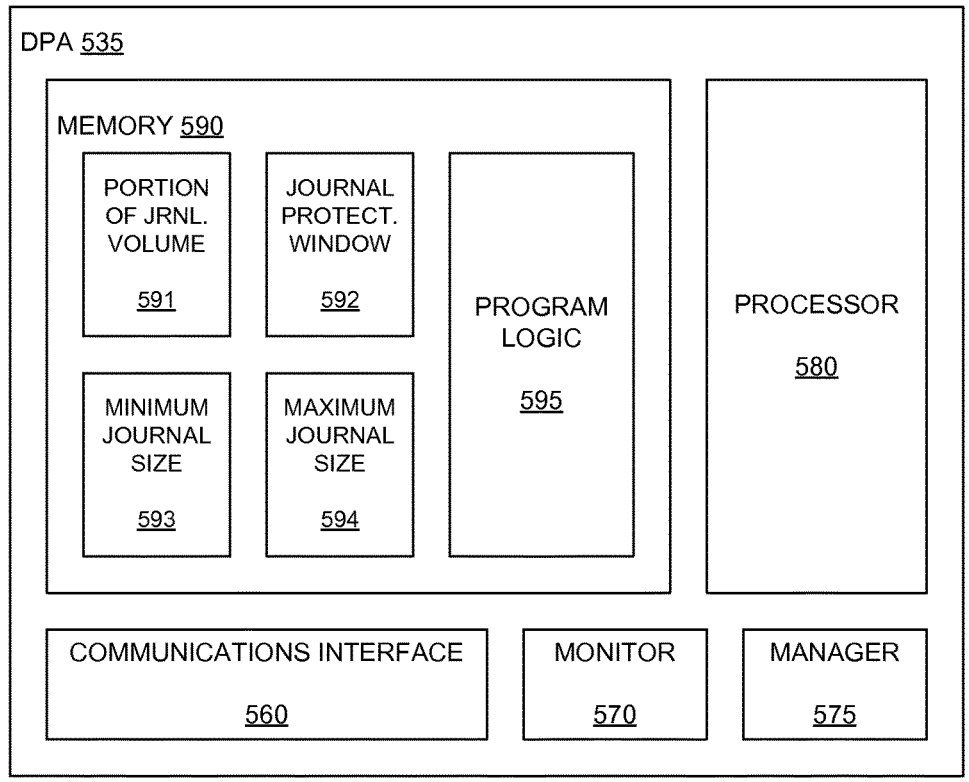
FIG. 5 is a block diagram of an example embodiment apparatus according to the present invention.

FIG. 5 is a block diagram of an example embodiment DPA 535 according to the present invention. The DPA includes memory 590, a processor 580, a communications interface 560, a monitor 570 and a manager 575. In addition to storing program logic 595, the memory may store values of the portion of the volume on which the journal is stored 591, the journal protection window 592, the minimum journal size 593 and the maximum journal size 594.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 5, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 6:
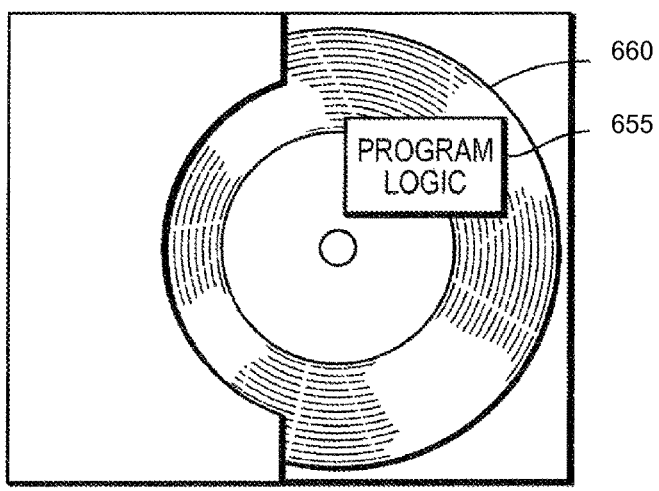
FIG. 6 is an illustration of an example embodiment of the present invention as embodied in program code.

FIG. 6 shows program logic 655 embodied on a computer-readable medium 660 as shown, and wherein the logic is encoded in computer-executable code configured for carrying out the gas controlling process of this invention and thereby forming a computer program product 600.

The logic for carrying out the method may be embodied as part of the aforementioned system, which is useful for carrying out a method described with reference to embodiments shown in, for example, FIGS. 3A-3B and 4A-4B. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer-implemented method comprising:
storing a plurality of journal data streams for a journal in thin-provisioned storage, the journal having a size defined by a first number of segments provided by one or more logical units provisioned for journal storage;
monitoring fullness of the journal, wherein the fullness of the journal is defined by a relationship between the size of the journal as defined by the first number of segments and a second number of segments used by the journal to store journal data; and
managing the size of the journal according to a policy, wherein the size of the journal is adjusted dynamically according to the policy as determined by the fullness of the journal, comprising deallocating logical units providing excess segments no longer used by the journal to store journal data based upon the fullness of the journal, and comprising deallocating logical units of the journal according to a determination of remaining available user physical storage space in a storage pool from which the journal is allocated.

2. The method of claim 1 wherein managing the size of the journal comprises increasing or decreasing the size of the journal according to the policy.

3. The method of claim 2 wherein the plurality of journal data streams comprises a DO stream and an UNDO stream each comprising linked lists of data blocks, and wherein decreasing the size of the journal according to the policy comprises using a punch command to erase data from blocks of the UNDO stream.

4. The method of claim 2 wherein increasing the size of the journal according to the policy comprises:
defining a size of the journal; and
writing data to unwritten portions of the journal.

5. The method of claim 1 wherein the size of the journal is managed according to a portion of a volume on which a user volume is stored.

6. The method of claim 1 wherein storing a plurality of journal data streams for a journal in thin-provisioned storage comprises storing the plurality of journal data streams for the journal in a plurality of thin provisioned logical units.

7. The method of claim 1 wherein the size of the journal is managed according to a journal protection window for which journal data is retained.

8. The method of claim 1 wherein the size of the journal is managed according to a minimum journal size and a maximum journal size.

9. An apparatus comprising:
one or more processors; and
memory storing instructions that, when executed on the one or more processors, cause the apparatus to:
store a plurality of journal data streams for a journal in thin-provisioned storage, the journal having a size defined by a first number of segments provided by one or more logical units provisioned for journal storage;
monitoring fullness of the journal, wherein the fullness of the journal is defined by a relationship between the size of the journal as defined by the first number of segments and a second number of segments used by the journal to store journal data; and
manage the size of the journal according to a policy, wherein the size of the journal is adjusted dynamically according to the policy as determined by the fullness of the journal, comprising deallocating logical units providing excess segments no longer used by the journal to store journal data based upon the fullness of the journal, and comprising deallocating logical units of the journal according to a determination of remaining available user physical storage space in a storage pool from which the journal is allocated.

10. The apparatus of claim 9 wherein the memory further stores instructions that, when executed on the one or more processors, cause the apparatus to increase or decrease the size of the journal according to the policy.

11. The apparatus of claim 10 wherein the plurality of journal data streams comprises a DO stream and an UNDO stream each comprising linked lists of data blocks, and wherein the memory further stores instructions that, when executed on the one or more processors, cause the apparatus to decrease the size of the journal according to the policy by using a punch command to erase data from blocks of the UNDO stream.

12. The apparatus of claim 10 wherein the memory further stores instructions that, when executed on the one or more processors, cause the apparatus to increase the size of the journal according to the policy by defining a size of the journal and writing data to unwritten portions of the journal.

13. The apparatus of claim 9 wherein the memory further stores instructions that, when executed on the one or more processors, cause the apparatus to manage the size of the journal according to a portion of a volume on which a user volume is stored.

14. The apparatus of claim 9 wherein the memory further stores instructions that, when executed on the one or more processors, cause the apparatus to store the plurality of journal data streams for the journal in storage in a plurality of thin provisioned logical units.

15. The apparatus of claim 9 wherein the memory further stores instructions that, when executed on the one or more processors, cause the apparatus to manage the size of the journal according to a journal protection window for which journal data is retained.

16. The apparatus of claim 9 wherein the memory further stores instructions that, when executed on the one or more processors, cause the apparatus to manage the size of the journal according to a minimum journal size and a maximum journal size.

17. A computer program product including a non-transitory computer-readable storage medium encoded with computer program code that, when executed on a processor of a computer, causes the computer to manage a size of a journal, the computer program product comprising:
computer program code for storing a plurality of journal data streams for a journal in thin-provisioned storage, the journal having a size defined by a first number of segments provided by one or more logical units provisioned for journal storage;
computer program code for monitoring fullness of the journal, wherein the fullness of the journal is defined by a relationship between the size of the journal as defined by the first number of segments and a second number of segments used by the journal to store journal data; and computer program code for managing the size of the journal according to a policy, wherein the size of the journal is adjusted dynamically according to the policy as determined by the fullness of the journal, comprising deallocating logical units providing excess segments no longer used by the journal to store journal data based upon the fullness of the journal, and comprising deallocating logical units of the journal according to a determination of remaining available user physical storage space in a storage pool from which the journal is allocated.

* * * * *